May 22, 1951     J. P. COSTELLO     2,554,015

CLAMP FOR BARS, RODS, AND THE LIKE

Filed June 30, 1948

INVENTOR.
JEROME P. COSTELLO.

BY
Murray, Sackhoff & Poldeck.
ATTYS.

Patented May 22, 1951

2,554,015

UNITED STATES PATENT OFFICE 2,554,015

CLAMP FOR BARS, RODS, AND THE LIKE

Jerome P. Costello, Cincinnati, Ohio

Application June 30, 1948, Serial No. 36,205

6 Claims. (Cl. 287—78)

The invention relates to clamp devices for rods, bars, cables and kindred members and has for an object the provision of simple, strong, and easily applied means to effect a quick positive connection of such members in endwise overlapped relation.

Another object of the invention is to provide means of this kind that require a minimum of overlap of the connected members and yet assure a positive alignment of the axes of the members in a common plane, thus affording several important advantages over the commonly known wire wrapped bar splice as used in the field in ferro-concrete construction.

Still another object of the invention is to provide a device of this kind that lends itself to effective bonding in cement and concrete and also permits a better bonding of the bars or other members which are connected thereby.

These and other important objects are attained by the means described herein and exemplified in the accompanying drawings, in which.

Figure 1:
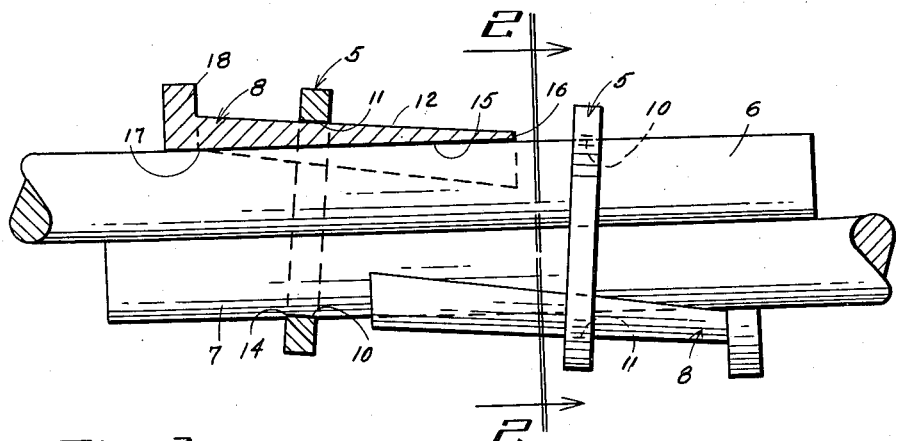
Fig. 1 is a side elevational view showing the overlapped ends of a pair of rods secured together by a pair of clamp devices of the invention, one of the devices being shown in cross section.

The joining or splicing of members such as bars, rods and other kindred elements for various purposes in the field has entailed some difficulties and disadvantages. For example, in ferro-concrete work the reenforcing bars to be spliced are frequently overlapped for a distance equal to forty-eight diameters of the bars and a wound wire wrapping is applied to both ends of the joint. This requires much time and considerable care to make the connection and is wasteful of metal.

Various types of clamp devices employing bolts and the like have been known but they are expensive and require time and care in the proper use thereof.

It is a special object of the invention to provide a device that simultaneously aligns the axes of the overlapped ends of a pair of bars in a known common plane and positively fixes the bars in that relation by the mere driving of a wedge using a hammer or any convenient object for the purpose.

The device comprises an apertured member or yoke 5 to loosely encircle the overlapped ends of a pair of bars or rods 6 and 7, and a suitably formed wedge 8 to effect the binding and alignment of the bars with respect to each other and to the longitudinal axis of the aperture 9 of yoke 5.

The yoke or apertured member 5 may be made in any suitable way, for example by stamping it from heavy gauge steel sheets or plates and then preferably hardening the finished yoke member. The aperture 9 is elongated and has its opposite ends of predetermined different sizes. The smaller end 10 is shaped to contact an appreciable transverse surface portion of one of the bars or rods 6, while the larger end 11 of the aperture 9 is shaped to suit the outside face 12 of wedge 8. An inspection of Figs. 1 and 2 discloses that the wedge 8 is longitudinally centered in a common plane with the major diameter of aperture 9 of yoke 5. I prefer to make the yoke 5 of flat stock so that the straight sides of the wall 13 of aperture 9 will form a sharp right angle at 14, thus allowing the conforming outside face 12 of wedge 8 to slide smoothly in the larger end 11 of the aperture 9, and permitting the corner angle 14 in the smaller end 10 of aperture 9 to bite into the rod or bar 7 when the yoke 5 is tilted at an angle of less than 90° to the diameter of said rod 7. (See Figs. 1 and 2.)

Figure 2:
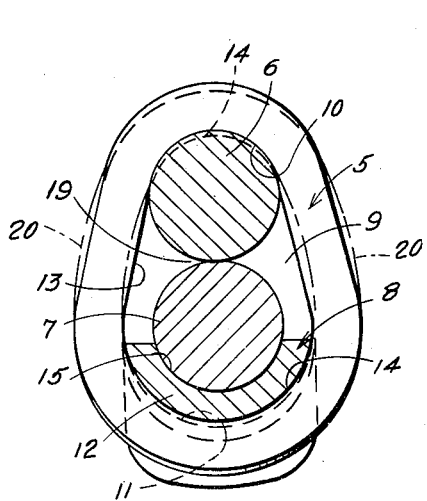
Fig. 2 is a view taken on line 2—2 of Fig. 1.

As can be seen in Figs. 1 and 2 the wedge has on its inside face a groove 15 centered longitudinally with the wedge and inclined with respect to the outer face 12 thereof; the said groove also narrows from the sharp end 16 and stops at 17 short of the driving or enlarged head end 18. The longitudinal body section of the wedge will thus conform to the bar or rod 6 or 7 on which it is disposed and present an outer face 12 that is inclined with respect to the length of the bar. When the wedge is entered into the larger end 11 of aperture 9 in the yoke and is driven into said aperture, the yoke is tilted relative to the bars enabling outer face 12 of the wedge to slide smoothly on the contacting portion of the wall of the aperture 9 in the yoke and at the same time causing the sharp corner 14 to bite into the companion rod or bar and preventing the yoke from sliding along the bars under the impact of hammer blows on the head 18 of wedge 8. The self alignment of the axes of bars or rods 6 and 7 in a plane with the longer or major diameter of aperture 9 in the yoke proceeds as a function of driving the wedge along one of the bars in effecting the positive binding of the bars on each other along a line or area of mutual contact 19. The contour of the connecting side portions 20—20 of the yoke is desirably made very slightly arcuate as shown in greatly exaggerated proportions by the dot and dash line in Fig. 2 so that these portions of the yoke may be relatively straightened when placed under tension by heavy wedging action when the member 8 is driven solidly into the position shown in Fig. 1.

In use in ferro-concrete work the bars 6 and 7 are thus quickly joined in a rigid and accurate position with respect to the plane of major stress in the proposed structure. Should the position of the connected bars as placed by the laborer be considered incorrect in the judgment of a supervisor it requires but a short time to release the wedge by driving it out and to readjust and reconnect the parts as desired. The poured concrete will readily contact all parts of the bars and the clamp devices so that the binding becomes permanent and more complete than in other known forms of bar splices in the art.

It is to be understood that devices of the invention will be made in suitable sizes to accommodate bars or rods and the like of different diameters and shapes. It will also be readily apparent that bars of dissimilar diameters and/or shapes may be connected by utilizing a grooved inside face such as 15 to accommodate a selected bar so that the groove contacts the surface of the bar or a number of circumferential points on the bar uniformly on opposite sides of a vertical plane cutting the bar, the yoke and the wedge. The various modifications necessary to adapt clamps of the invention to generally or specifically different situations will be readily apparent from the foregoing if it be remembered that the outside of the wedge will substantially conform to the inside large end of the aperture in the yoke 5, while the smaller end of the aperture will contact the peripheral portion of one bar and the groove in the wedge will contact the other bar in a generally similar manner.

Figure 3:
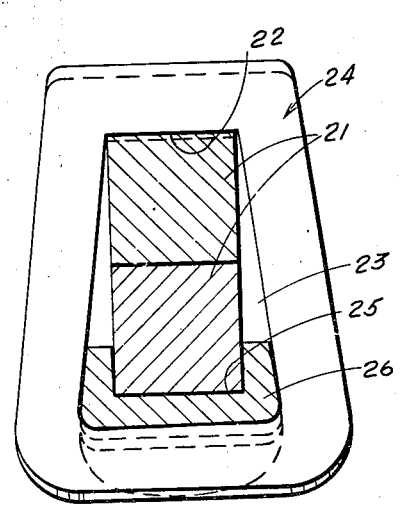
Fig. 3 is a view similar to Fig. 2, but showing a modified form of the device for use on bars of rectangular cross section.

In Fig. 3 one of the contemplated modifications is shown for use with bars of square cross section. The square bars 21—21 have flat faces thereof in abutment, while the relatively opposite faces of said bars seat on and are aligned by the small end 22 of aperture 23 in yoke 24 and the conforming groove 25 in the tapered wedge 26. The binding action and the biting action of the yoke is as hereinbefore described.

In all cases the bars will be connected with great tensile strength and with rigidity comparable to that of the individual bars. Two of the clamps are preferably used where heavy stress and vibration on the structure may be expected. It is to be noted that the overlap of the bars necessary to accommodate two clamps may be of lesser extent than the length of two wedges. Considerable bar stock is thus saved and the ends of the bars need no preparation in order to connect them with the clamp devices.

What is claimed is:

1. In a clamp for connecting overlapped ends of a pair of bars, the combination of a thin plate-like rigid member having an aperture of elongated cross-sectional form extending through the thickness of said member for receiving the said overlapped ends and a wedge for frictional driven engagement between one of the bars and one end of the elongated aperture, the wedge having a tapered groove on its inner face substantially conforming to the periphery of one of said bars, one longitudinal end of the said elongated aperture conforming to the periphery of the other of said bars, the remaining longitudinal end of said aperture being larger than the first mentioned end thereof and shaped to conform to the outer longitudinal face of the wedge for tilting the said rigid member into non-perpendicular relation to the bars and causing the edge corner bounding the aperture therein to bite into the bar which it contacts.

2. In a device of the class described a flat thin rigid yoke having an aperture of elongated cross-sectional form through its thickness, the opposite longitudinal ends of the aperture being one larger than the other, the smaller end of said aperture shaped for substantial conformity with one of a pair of bars to be entered into said aperture, a wedge having an outer face conforming substantially to the larger longitudinal end of said aperture, the said wedge having a longitudinal groove in the inner face thereof substantially conforming to the surface of the other of said bars and longitudinally inclined with relation to the outer face of the wedge.

3. In a device of the class described a thin rigid member having an aperture of elongated cross-sectional form extending through its thickness, said aperture being tapered in the direction of one end which end is adapted to conform to one of a pair of bars to be joined, a wedge member having an outer side conforming transversely with the opposite end of said aperture, the relatively inner face of said wedge having a longitudinally tapered groove therein conforming to a longitudinal surface section of another of a pair of bars in progressively decreasing lateral extent from one end of said wedge to the relatively opposite end of said groove and an integral driving lug on the end of the wedge adjacent the shallow end of the groove.

4. In a device of the class described a rigid plate member having a straight walled aperture of elongated cross-sectional form extending through the thickness thereof, which aperture is relatively smaller at one longitudinal end and larger at the opposite longitudinal end, an elongated wedge for frictionally binding between the said larger end of the aperture and a pair of overlapped bars in said aperture, the wedge having a groove in one face adapted to slidably contact a longitudinal surface portion of one inserted bar, said groove being progressively shallower and narrower from one end of the wedge toward the other end of said wedge.

5. In a device of the class described a thin flat yoke having an aperture of elongated cross-sectional form smaller at one end of its major cross-sectional axis than at the other and a drivable member for entry into conformity with the said opposite longitudinal end of the aperture, the inner face of said drivable member having a longitudinal groove of progressively narrower and shallower dimensions throughout its length, the wall of said groove conforming in lateral section to a surface of one of a pair of abutting bars inserted in the aperture whereby movement of the drivable member serves to tilt the yoke angularly with respect to the axes and diameters of said bars and into corner edgewise engagement with the surface of one of said bars.

6. In a device of the class described a thin rigid member having an aperture of elongated cross-sectional form therethrough, the aperture being larger at one end of its major cross-sectional axis than at the other, a wedge having a tapered groove on its inner longitudinal face and having its opposed outer face uniformly arranged to conform with the wall of the larger end of said aperture, the smaller end of the aperture and the said groove respectively being formed according to the surface contours of a pair of bars to be inserted between them for connection thereby and a driving lug on the end of the wedge offset radially outwardly of the groove.

JEROME P. COSTELLO.

REFERENCES CITED

The following references are of record in the file of this patent:

UNITED STATES PATENTS

| Number | Name | Date |
|---|---|---|
| 1,012,506 | Blair | Dec. 19, 1911 |

FOREIGN PATENTS

| Number | Country | Date |
|---|---|---|
| 27,089 | Norway | July 10, 1916 |
| 353,377 | Germany | May 13, 1922 |
| 249,798 | Italy | Aug. 16, 1926 |